United States Patent [19]

Hojoh

[11] Patent Number: 4,747,311

[45] Date of Patent: May 31, 1988

[54] GAS PRESSURE GAGE

[75] Inventor: Hisao Hojoh, Musashino, Japan

[73] Assignee: Seiko Instruments Inc., Tokyo, Japan; a part interest

[21] Appl. No.: 24,370

[22] Filed: Mar. 10, 1987

[30] Foreign Application Priority Data

Mar. 20, 1986 [JP] Japan .................................. 61-62393

[51] Int. Cl.$^4$ ............................................ G01L 11/00
[52] U.S. Cl. ......................................... 73/702; 73/714; 73/756; 324/460
[58] Field of Search ................. 73/704, 702, 714, 753, 73/711, 709, 756; 324/460, 461, 462, 463

[56] References Cited

U.S. PATENT DOCUMENTS 3,064,478 11/1962 Schafer .................................. 73/384
3,902,355 9/1975 Weisser .................................. 73/702
4,314,205 2/1982 Paitich .................................. 324/462

Primary Examiner—Donald O. Woodiel
Attorney, Agent, or Firm—Bruce L. Adams; Van C. Wilks

[57] ABSTRACT

Regarding a gas pressure gage for measuring a gas pressure in a vacuum chamber of a semiconductor element manufacturing apparatus, or the like, the present invention has made it possible to attain a small-sized and unitary gas pressure gage and to implement a thorough measurement of gas pressure from the atmospheric pressure to a high vacuum of about $10^{-10}$ Torr, by mounting both a mechanical vibrator type pressure gage and an ionization type pressure gage on a flange provided for fitting a chamber and by providing a control circuit for making the former gage operate in a low-vacuum region and the latter in a high-vacuum region.

3 Claims, 3 Drawing Sheets

GAS PRESSURE GAGE

BACKGROUND OF THE INVENTION

The present invention relates to a gas pressure gage for measuring a pressure in a vessel such as a vacuum chamber.

A diaphragm pressure gage based on a system of utilizing a pressure difference applied on a diaphragm of an elastic material, a Pirani gage utilizing thermal conduction, an ionization-type pressure gage based on a system wherein a gas is ionized by electrons and an ion current generated thereby is measured so as to measure an amount proportional to the molecular density of the gas, etc. have been known heretofore as the gas pressure gages for measuring gas pressure in a vacuum chamber of a semiconductor element manufacturing apparatus, or the like.

A unitary gas pressure gage enabling the measurement of pressure in a wide range from an exhausting process of a pump to an achievable pressure ($10^{-10} \sim 10^{-6}$ Torr) and an operating pressure ($10^{-3} \sim 10^{-1}$ Torr) is demanded in regard to apparatuses, including the semiconductor element manufacturing apparatus, which utilize vacuum.

The diaphragm pressure gage and the Pirani vacuum gage used heretofore can not be employed solely, however, since a region measurable therein by a single measuring element is of so low vacuum as the atmospheric pressure to $10^{-3}$ Torr. The conventional ionization-type vacuum gage can not be employed solely either, since a region measurable therein by a single measuring element is of so high vacuum as $10^{-3} \sim 10^{-10}$ Torr, to the contrary.

In order to measure the whole of these regions (from the atmospheric pressure to $10^{-10}$ Torr), therefore, it is necessary to mount at least two kinds of gas pressure gages for different measuring regions on separate flanges and to fit these flanges to a chamber, which would be troublesome and inconvenient. It is impossible practically, on the other hand, to incorporate the diaphragm pressure gage or the Pirani vacuum gage and the ionization-type vacuum gage integrally into one flange to form a single gas pressure gage, since the structure of a pressurereceiving element becomes large in size.

SUMMARY OF THE INVENTION

The present invention is aimed to solve the abovedescribed problems of prior art, and a gas pressure gage being mountable on a single flange and small in size and enabling the thorough measurement of a wide range of pressure (from the atmospheric pressure to $10^{-10}$ Torr) has been obtained for this purpose. This gas pressure gage is constructed by the following means: incorporating a pressure gage using a mechanical vibrator and a pressure gage of an ionization type into a common flange, and providing a control circuit for making the pressure gage using a mechanical vibrator operate in a low-vacuum region and the ionization-type pressure gage in a high-vacuum region.

The pressure gage utilizing the electrical characteristic of the mechanical vibrator that is varied under the pressure of gas from 10 atms to $10^{-4}$ Torr is subminiature and has no effect on the ionization-type pressure gage even when it is mounted together with this gage. Moreover, the structural material of the mechanical vibrator is stable and thus it can stand the use even in a high-vacuum region. The incorporation of the mechanical vibrator and the ionization-type pressure gage in the same flange by making sue of the above-stated distinctive features of the former has made it possible, without impairing the merits of the conventional ionization-type pressure gage, to obtain the gas pressure gage which enables the consecutive measurement of pressure in a region ranging from the atmospheric pressure to $10^{-10}$ Torr.

BRIEF DESCRIPTION OF THE DRAWINGS

FIG. 3 (b) shows the resonant impedance pressure characteristic of a quartz vibrator.

DETAILED DESCRIPTION OF THE PREFERRED EMBODIMENT

A preferred embodiment of a gas pressure gage of the present invention will be described in detail hereunder according to drawings.

Figure 1:
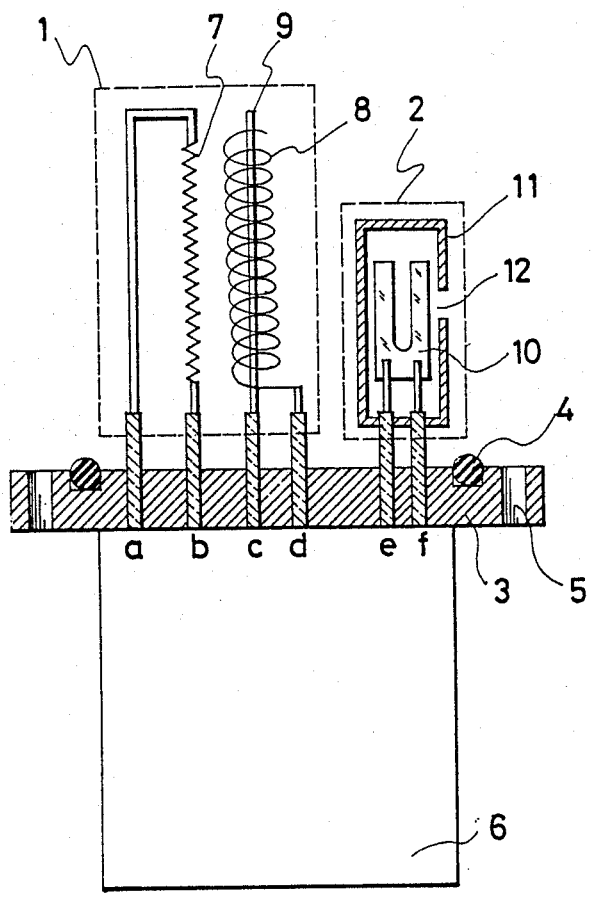
FIG. 1 shows an overall construction of a gas pressure gage.

FIG. 1 shows an overall structure of the gas pressure gage. Numeral 1 denotes a pressure gage of an ionization type, which can measure a pressure in a region of $10^{-4} \sim 10^{-10}$ ($10^{-7}$) Torr. Numeral 2 denotes a pressure gage using a mechanical vibrator and measuring a pressure in a region from the atmospheric pressure to $10^{-4}$ Torr. 3 denotes a common flange whereon the ionization-type pressure gage 1 and the mechanical vibrator type pressure gage 2 are mounted together. The flange 3 is made to contact with an opening of a vacuum chamber (not shown in the figure) with an O-ring 4 interposed between them, and is fixed tightly to the chamber by bolts (not shown in the figure) put in screw holes 5. When baking of the chamber is required for attaining an ultra-high vacuum (about $10^{-10}$ Torr), a gasket formed of a copper plate or the like may be used in place of the O-ring 4. 6 denotes a control circuit comprising a constant-voltage power source for driving this gas pressure gage, an oscillation circuit, a measuring circuit, an arithmetic circuit, a display unit, etc.

Figure 3A:
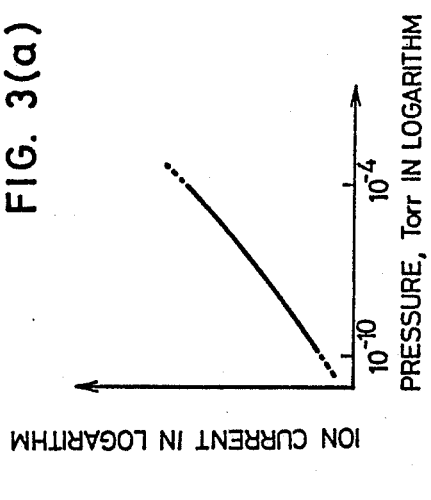
FIG. 3 (a) shows the ion current - pressure characteristic of a B-A gage.
Figure 3B:
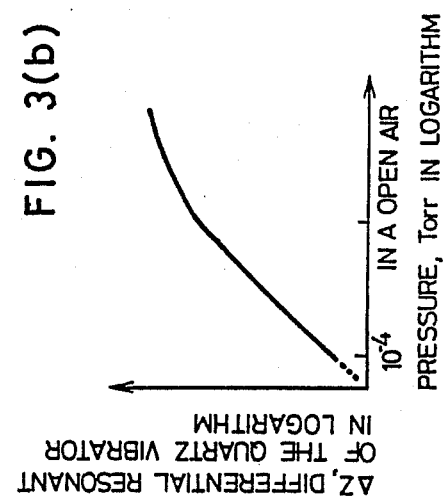

Next, a detailed description will be made on the ionization-type pressure gage 1. A Bayard-Alpert gage (hereinafter called a B-A gage) is employed in the present embodiment. The ionization-type pressure gage to be used therein is not limited to this gage, but a cold-cathode-type ionization vacuum gage utilizing Penning discharge, and a triode-type ionization vacuum gage using a hollow-cylindrical collector, may be employed as well. A pressure in a region of $10^{-4}$ Torr or below is measured by this B-A gage 1. In this gage, as shown in FIG. 1, thermions emitted from a filament 7 made of tungsten or the like gather first at a grid 8 subjected to the impression of positive potential. Then, repeating reciprocating motions inside the grid 8 on a coil, the thermions collide with gas molecules inside the chamber, ionizing the gas molecules into ions. The ions thus generated are collected by a collector 9 positioned along the central axis of the grid 8 and impressed with negative potential, and are turned thereby into an ion current. FIG. 3 (a) shows the relationship of ion current-pressure characteristic of the B-A gage. The axis of ordinate shows the ion current, and the axis of abscissa a gas pressure. As is apparent from this figure, the ion current is proportional to the density of gas molecules, and accordingly it can be utilized for the measurement of the gas pressure. It is because the filament 7 is burnt out that a pressure larger than $10^{-4}$ Torr can not be measured in FIG. 3 (a). In addition, it is because soft X-rays are generated to be noise on the occasion of the collision of thermions with the grid 8 that a pressure smaller than $10^{-10}$ Torr can not be measured.

Referring again to FIG. 1, a detailed description will be made on the pressure gage 2 using a mechanical vibrator. In the present embodiment, a fork-type quartz vibrator 10 is employed as the mechanical vibrator. The pressure in the region ranging from the atmospheric pressure to $10^{-4}$ Torr is measured by this fork-type quartz vibrator. In this relation, another piezoelectric element of barium titanate or the like or a vibrator driven by a magnetic field may be employed as the mechanical vibrator. Also a quartz vibrator of another type may be employed other than the fork-type one. Numeral 11 denotes a shield plate enclosing the quartz vibrator 10, and it blocks charged particles emitted from the B-A gage and the thermal radiation therefrom and prevents an evaporated or sputtered material from sticking on the quartz vibrator 10. Numeral 12 denotes an opening provided in the shield plate 11 for making the quartz vibrator 10 continuous with a gas pressure inside the chamber (not shown in the figure). Now, when the fork-type quartz vibrator 10 is impressed with a certain alternating voltage and made to vibrate in a resonance frequency, the resistance component of an alternating impedance is varied by the gas pressure. FIG. 3 (b) shows this variation. The axis of ordinate shows the resonant impedance of the quartz vibrator, and the axis of abscissa the gas pressure. As is seen from the FIG. 3 (b), a value in a region from $10^{-4}$ Torr to the atmospheric pressure can be known from a value of the resonant impedance (or a resonant current or a resonant voltage proportional thereto). The pressure below $10^{-4}$ Torr can not be measured, because a variation in the resonant impedance is so small that it causes an error in measurement.

Figure 2:
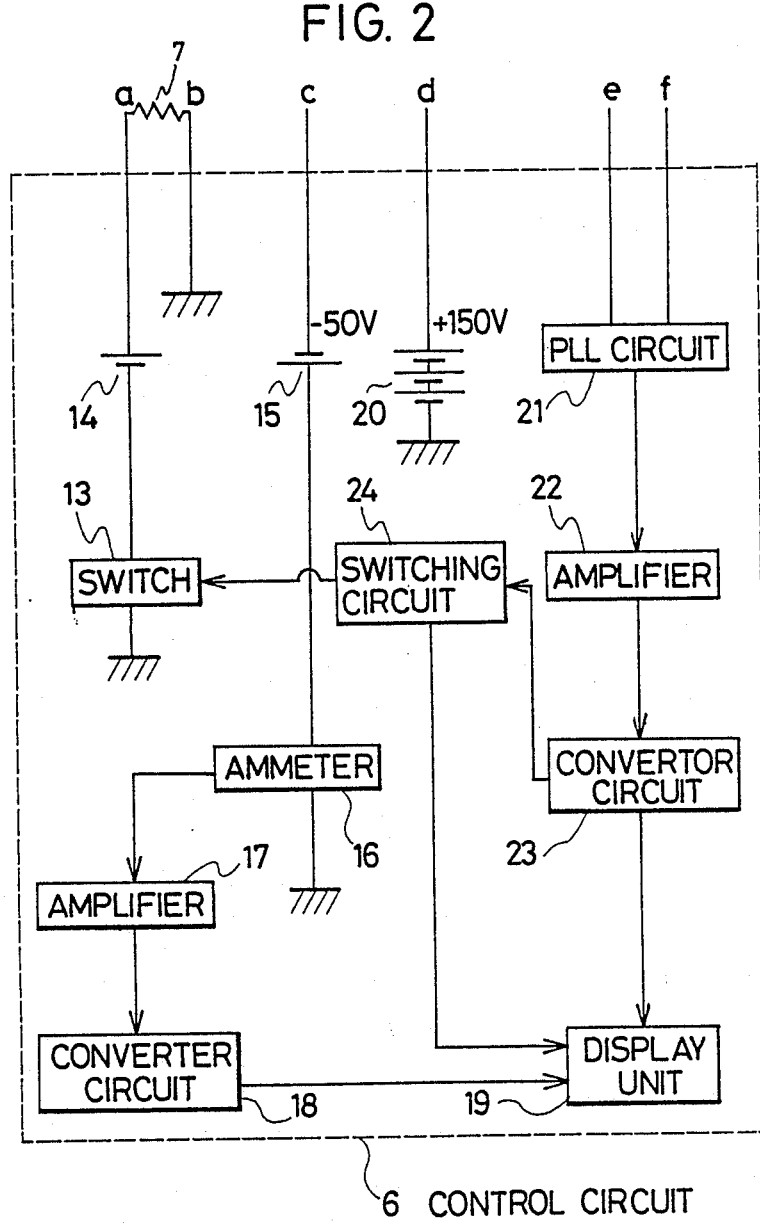
FIG. 2 is a block diagram of a control circuit of the gas pressure gage.

Next, the control circuit 6 will be described concretely with reference to FIG. 2. Terminals a and b are connected with the filament 7 of the B-A gage, a terminal c with the collector 9, and a terminal d with the grid 8. Terminals e and f are connected with a set of electrode terminals of the fork-type quartz vibrator respectively. Between the terminals a and b a constant-voltage power source 14 is connected through the intermediary of a switch 13, whereby the filament 7 is heated to emit thermions. The switch 13 turns ON when a prescribed vacuum (e.g. $10^{-4}$ Torr) is reached inside the chamber, on which a description will be made later, and a current is thereby made to flow through the filament 7 to operate the B-A gage. The switch operates also to prevent the filament 7 from being burnt out. The terminal c is connected with a constant-voltage power source 15, whereby a collector potential is maintained at $-50$V, for instance, so that ions be collected. Between the constant-voltage power source 15 and the ground an ion ammeter 16 is connected so as to measure a value of an ion current. After being amplified by an amplifier 17, said value is converted by a converter circuit 18 into a value of pressure in accordance with an ion current - pressure characteristic curve shown in FIG. 3 (a), and the result of conversion is displayed on a display unit 19. The terminal d is connected with a constant-voltage power source 20, whereby the grid is maintained at a positive voltage (e.g. $+150$V). The thermions emitted from the filament 7 are gathered and made to vibrate and collide with gas molecules so as to generate ions.

The terminals e and f are connected with a phase-locked loop circuit (PLL circuit) 21. The PLL circuit 21 is a driving circuit for making the quartz vibrator 10 vibrate in a stable manner at its own natural resonance frequency. A resonant voltage signal in response to the resonant impedance is delivered from the PLL circuit 21 to an amplifier 22. The signal amplified thereby is inputted to a converter circuit 23. The converter circuit 23 converts a resonant voltage value (corresponding to a resonant impedance value) into a pressure value according to a resonant impedance - pressure characteristic curve shown in FIG. 3 (b), and the result of conversion is displayed on the display unit 19.

Numeral 24 denotes a switching circuit, which is connected to the converter circuit 23. When the value of a pressure measured by the quartz vibrator is detected to be below a prescribed value (e.g. $10^{-4}$ Torr), said switching circuit delivers a control signal to the switch 13 and the display unit 19. By this control signal the switch 13 is turned ON to make the B-A gage operate. Simultaneously, the content of display on the display unit 19 is switched over from data on the quartz vibrator side to data on the B-A gage side.

Figure 4:
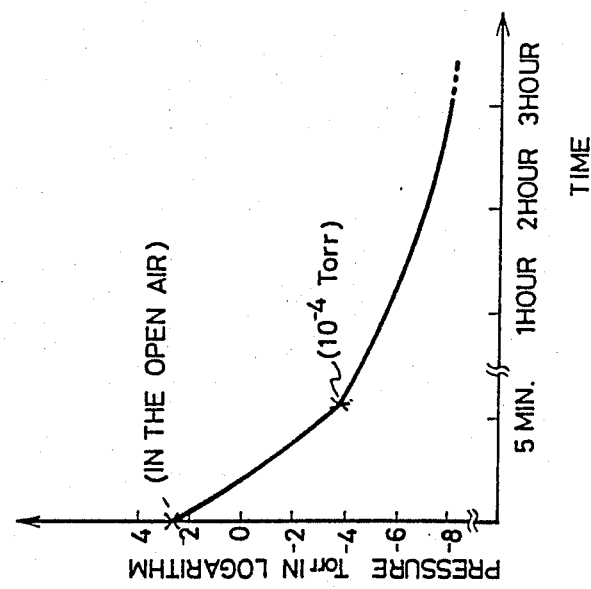
FIG. 4 shows the characteristic of exhaust time - pressure display.

FIG. 4 shows an example of the characteristic of exhaust time - pressure variation of the chamber, which is obtained by measuring same practically by using the gas pressure gage of the present invention. The axis of ordinate shows pressure and the axis of abscissa exhaust time. About five minutes after a vacuum pump starts to operate under the atmospheric pressure, first, the pressure drops to $10^{-4}$ Torr. Meanwhile the pressure is measured by the quartz vibrator element. When the pressure lowers below $10^{-4}$ Torr, then, the measurement of pressure turns automatically to be conducted by the B-A gage. Meanwhile the pressure inside the chamber continues to be measured automatically without a break.

The present invention enables the attainment of the gas pressure gage wherein a mechanical pressure gage being small in size and capable of measuring a low-vacuum region and an ionization-type pressure gage being small in size and capable of measuring a high-vacuum region are incorporated in a common flange and made to operate automatically each in its proper way according to pressure.

The present invention has an effect that the gas pressure gage is made small and unitary and enabled to conduct thorough measurement of pressure ranging from the atmospheric pressure to an ultra-high vacuum.

It has also an effect that an unexpected accident such as burning of a filament can be prevented since automatic switching is conducted in accordance with pressure.

What is claimed is:

1. A gas pressure gage wherein a pressure gage using a mechanical vibrator driven by an electric field or a magnetic field and an ionization-type pressure gage are incorporated in a common flange and which is provided with a control circuit for making the pressure gage using the mechanical vibrator operate in a low-vacuum region and the ionization-type pressure gage in a high-vacuum region.

2. A gas pressure gage according to claim 1 wherein the mechanical vibrator is a quartz vibrator.

3. A gas pressure gage according to claim 1 wherein the ionization-type pressure gage is a Bayard-Alpert gage.

* * * * *